United States Patent [19]

Camitz

[11] Patent Number: 4,884,915
[45] Date of Patent: Dec. 5, 1989

[54] JOINTING DEVICE PRIMARILY FOR SCAFFOLD OR STAND SYSTEM

[76] Inventor: Peter Camitz, Sigtunagatan 9, S-113 22 Stockholm, Sweden

[21] Appl. No.: 14,059

[22] Filed: Jan. 23, 1987

[30] Foreign Application Priority Data

May 24, 1985 [SE] Sweden ............................... 8502598

[51] Int. Cl.$^4$ ............................................. F16B 7/00
[52] U.S. Cl. .................................. 403/171; 403/176; 403/255; 403/217; 403/348
[58] Field of Search ............... 403/230, 171, 176, 172, 403/170, 192, 194, 187, 217, 218, 252, 256, 255, 254, 201, 264, 348, 349, 190

[56] References Cited

U.S. PATENT DOCUMENTS

| | | | |
|---|---|---|---|
| 1,404,522 | 1/1922 | Harris | 403/190 |
| 3,864,049 | 2/1975 | Ono | 403/171 |
| 3,867,048 | 2/1975 | Endzweig | 403/255 X |
| 3,982,841 | 9/1976 | Endzweig | 403/14 X |
| 4,017,199 | 4/1977 | Strassle | 403/190 X |
| 4,133,433 | 1/1979 | Wolf | 403/255 X |
| 4,334,797 | 6/1982 | Wahlin | 403/171 X |
| 4,480,418 | 11/1984 | Ventrella | 403/176 X |
| 4,591,286 | 5/1986 | Inchaurbe | 403/176 X |
| 4,763,459 | 8/1988 | Wesselski | 403/217 X |

FOREIGN PATENT DOCUMENTS 2603228 1/1977 Fed. Rep. of Germany ...... 403/252
2158544 11/1985 United Kingdom ................ 403/172

*Primary Examiner*—Randolph A. Reese
*Assistant Examiner*—Peter M. Cuomo
*Attorney, Agent, or Firm*—Nies, Webner, Kurz & Bergert

[57] ABSTRACT

A jointing device primarily for scaffold or stand system, for example in exhibition show cases and the like, which system is assembled of tubes (3). The jointing device is a junction, to which one or several tubes (3) are attached, where each tube has one end to co-operate with the jointing device. A pull rod (5) comprising a T-shaped end portion (6) is provided in each tube and cooperates with a preferably substantially spherical junction member (1). The jointing device has a substantially sleeve-shaped attachment member (34) inserted within the tube (3) comprising inner stop members (35) for co-operation with stop members (36) located at the pull rod (5), so that the pull rod without axial displacement is rotatable about the axial direction in relation to the sleeve (34) in a predetermined direction, but substantially not in the opposite direction.

7 Claims, 5 Drawing Sheets

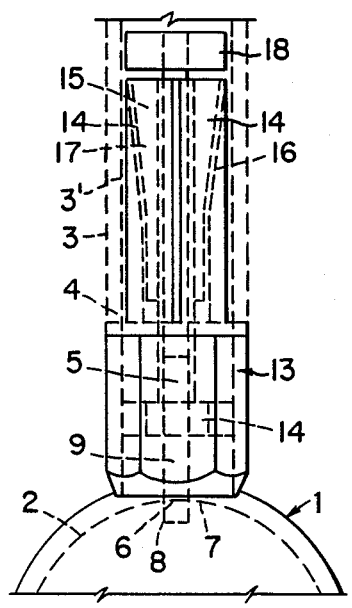
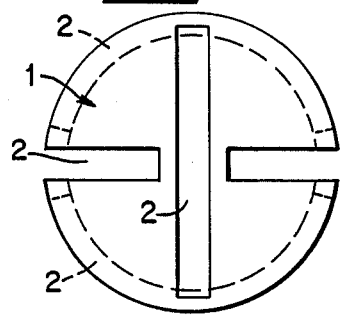
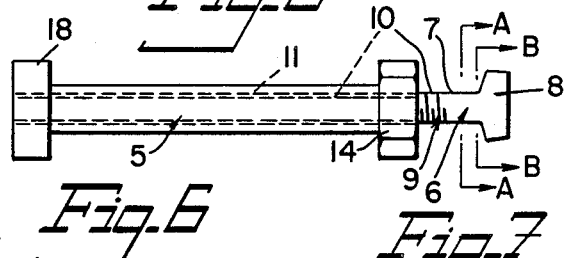
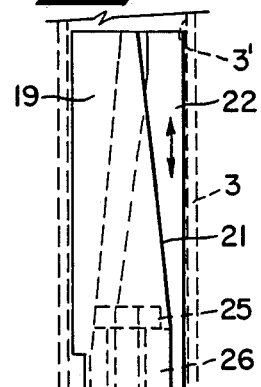
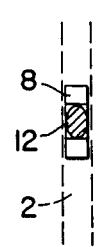
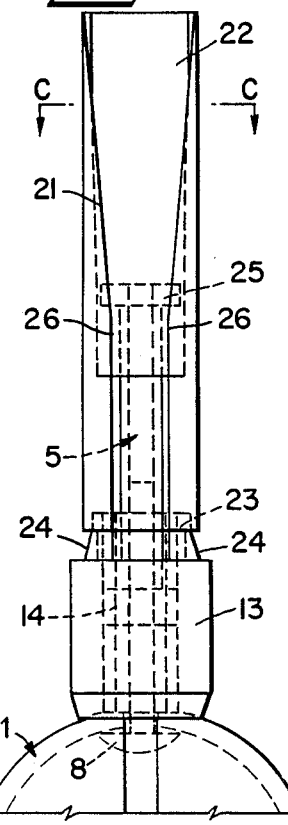
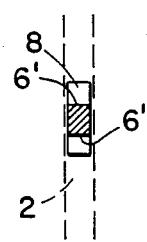
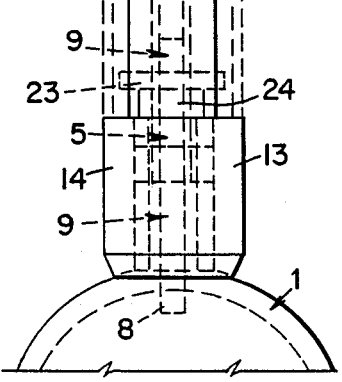

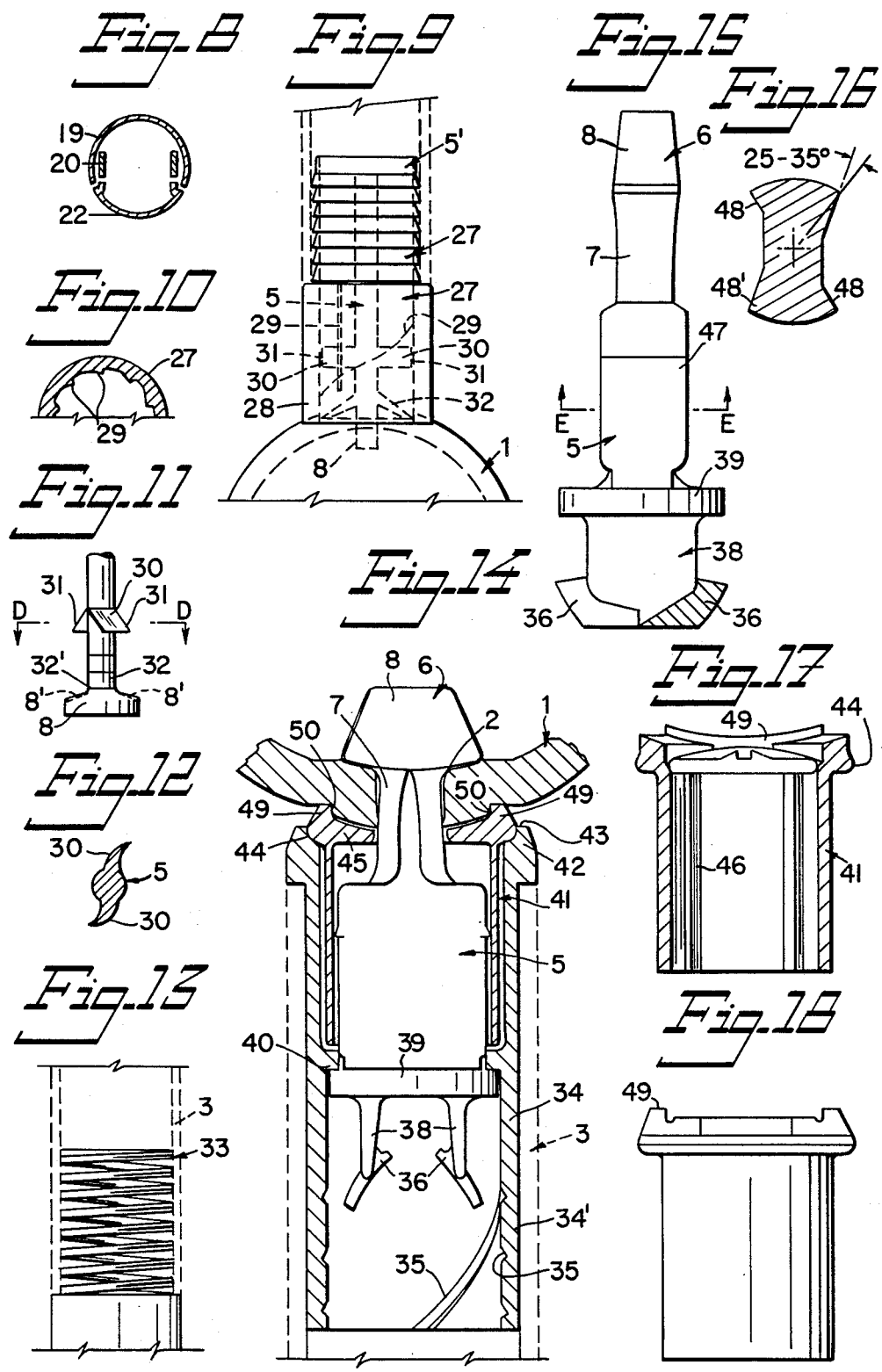

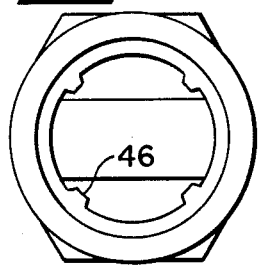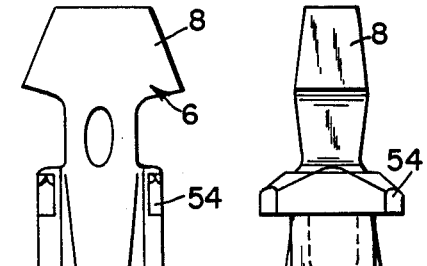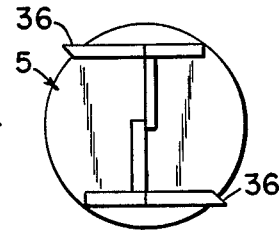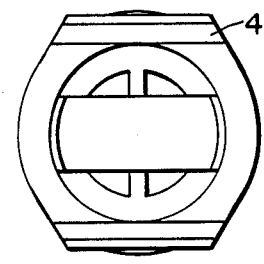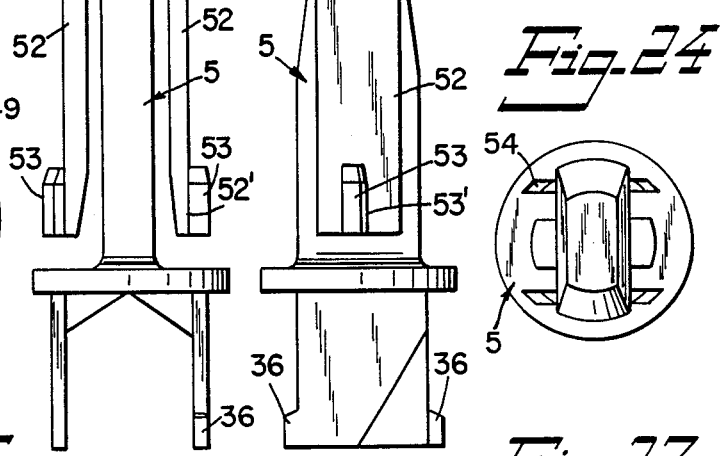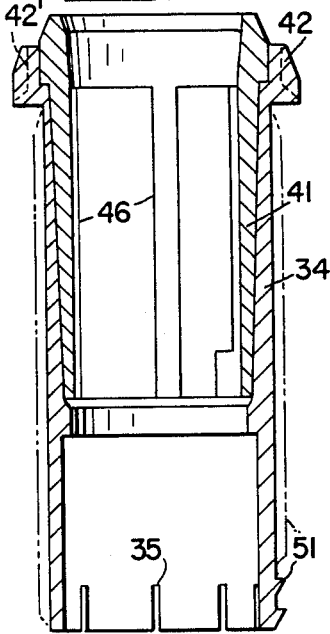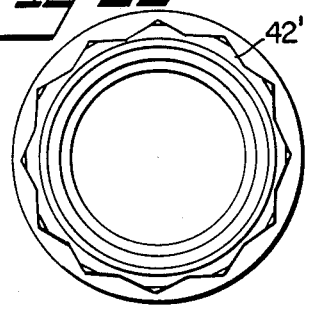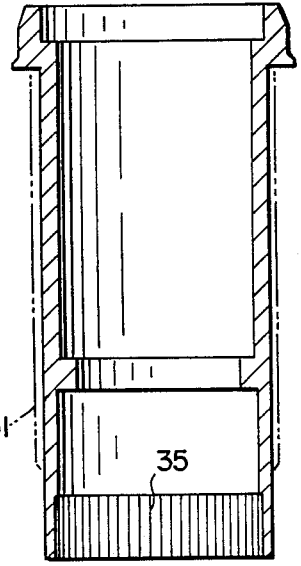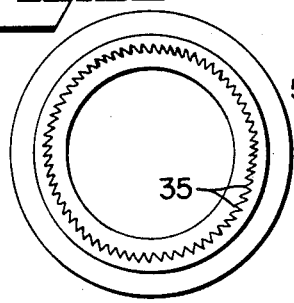

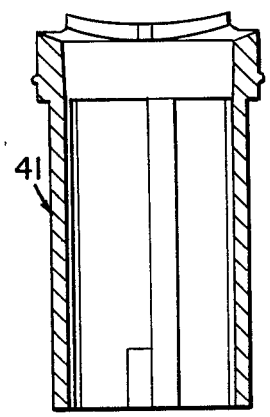
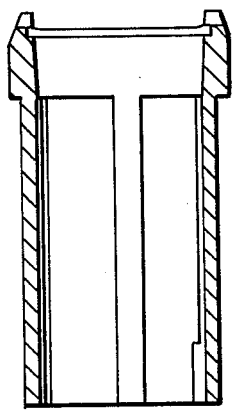
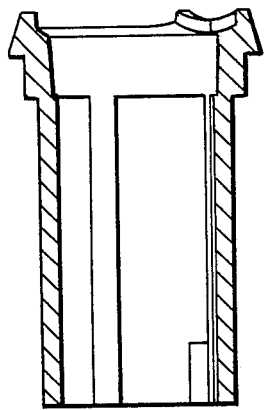
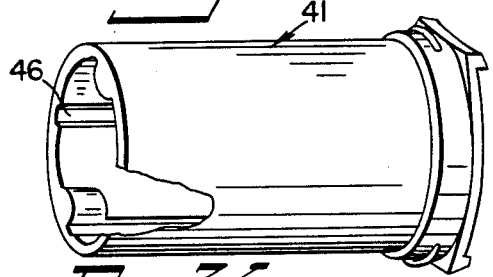
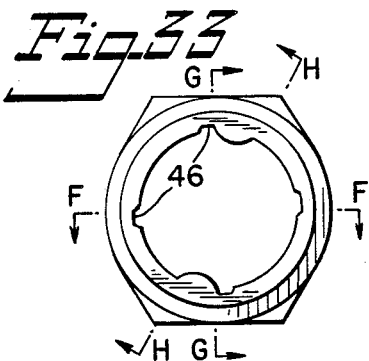
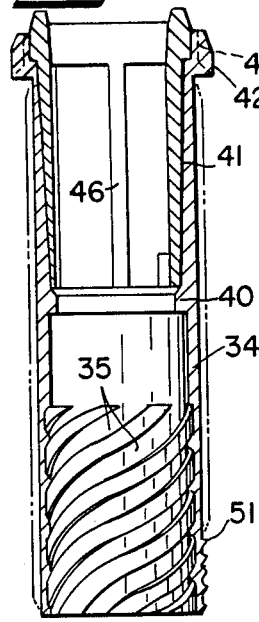
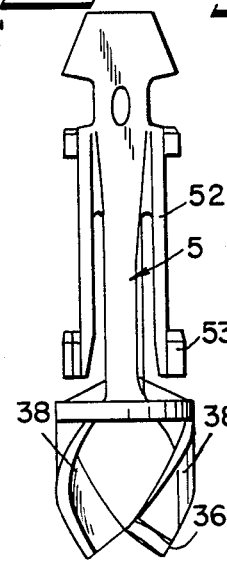
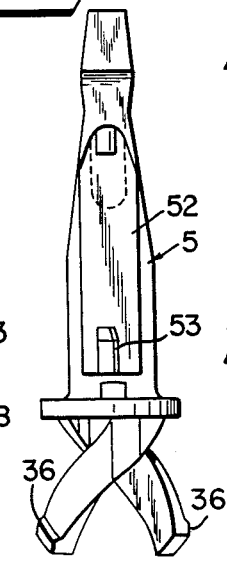
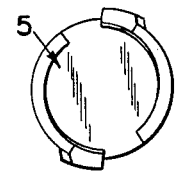
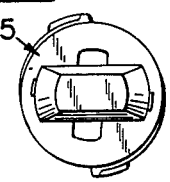

4,884,915

JOINTING DEVICE PRIMARILY FOR SCAFFOLD OR STAND SYSTEM

This invention relates to a jointing device to be used primarily for a scaffold or stand system, for example in exhibition show cases and the like, which system is intended to be assembled of tubes, and in which the jointing device is intended to be a junction, to which one or several tubes are attached, and each tube is intended with one end to co-operate with the jointing device, and means are provided to be inserted into a tube, and a pull rod is intended to co-operate with a junction member constituting a hold for the pull rod and holder-on, which junction member is fixed on the tube and capable to co-operate with more than one pull rod.

Devices of the kind described above are known previously. The present invention, however, relates to a jointing device, which in most applications implies improvements over the prior art. The device according to the invention, thus, simplifies the mounting work and requires less accessibility with respect to the pull rod portion co-operating with the junction member.

The invention, thus, relates to a a jointing device intended for use in scaffold or stand systems, for example, in exhibition show cases and the like, such a system being intended to be assembled of tubes which have equal inner and outer diameters, where the jointing device is intended to be a junction, to which one or several tubes are intended to be attached, and each tube is intended with one of its ends to co-operate with the jointing device, and means are provided to be located (inserted) in a tube, at that one of its ends, and to be fastened in the tube, and a pull rod or the like is provided to co-operate with a junction member which is preferably substantially spherical and arranged to constitute a hold for the pull rod which in turn results in the junction member being fixed to the tube. The junction member is arranged for co-operation with more than one pull rod and tube.

Further specific novel features reside in that, in the above described jointing devices, the end of the pull rod which co-operates with the junction member includes an axially extending portion and an outer transverse portion, forming a T-shape wherein the T-shaped portion is considerably thinner in the thickness direction, perpendicularly to the plane in which the T-shape is located, than the extension of the transverse portion in said plane, and that the junction member is provided with an inner cavity and comprises at least one longitudinal slit-shaped lead-in for the T-shaped end of the pull rod, in such a manner, that the length of the lead-in exceeds the extension of the transverse portion of the width of the lead-in slightly exceeds the extension of the T-shaped portion in said thickness direction.

Further novel features and other objects of this invention will become apparent from the following detailed description, discussion and the appended claims taken in conjunction with the accompanying drawings.

BRIEF DESCRIPTION OF DRAWINGS

Referred structural embodiments of this invention are disclosed in the accompanying drawings, in which:

FIG. 1 shows schematically a first embodiment of a jointing device according to the invention seen across the longitudinal direction of a tube, where the tube is only marked and a junction member shown only partially, FIG. 2 shows a junction member according to the invention, FIG. 3 shows an embodiment of a pull rod according to the invention seen across the longitudinal direction of the pull rod, FIG. 4 is a section A—A according to FIG. 3, FIG. 5 is a section B—B according to FIG. 3, FIG. 6 shows a second embodiment of a jointing device according to the invention seen across the longitudinal direction of a tube, where the tube is only marked and a junction member shown only partially, FIG. 7 shows the jointing device according to FIG. 6 seen from the right in FIG. 6, but without a marked tube, FIG. 8 is a section C—C according to FIG. 7, FIG. 9 shows a third embodiment of a jointing device according to the invention seen across the longitudinal direction of a tube, where the tube and junction member are shown as in FIGS. 1 and 6, FIG. 10 shows schematically half the cross-section of a sleeve with stopping members according to the invention, FIG. 100 shows a portion of a pull rod according to the invention comprising a.o. stopping wings, where the pull rod is intended for the jointing device according to FIG. 9, FIG. 12 is a section D—D according to FIG. 11, FIG. 13 shows schematically locking means substantially of coil spring configuration in a co-operation with a marked tube, FIG. 14 shows a fourth embodiment of a jointing device according to the invention seen across the longitudinal direction of a tube, where the tube is not shown and the junction member is shown only partially, and where only the pull rod comprised in the device is not shown in an axial section, FIG. 15 shows the pull rod according to FIG. 14 seen from the right in FIG. 14, FIG. 16 is a section E—E according to FIG. 15, FIG. 17 is an axial section through a locking sleeve substantially according to FIG. 14 according to the invention, FIG. 18 shows the sleeve according to FIG. 17, seen from the right in FIG. 17 and not in cross-section, FIG. 19 shows the sleeve according to FIG. 17 seen from below in FIG. 17 and not in cross-section, FIG. 20 shows the sleeve according to FIG. 17 seen from above in FIG. 17 and not in cross-section, FIG. 21 shows schematically a pull rod for a fifth embodiment of a jointing device according to the invention, where the pull rod is shown as the pull rod according to FIG. 14, FIG. 22 shows the pull rod according to FIG. 21 seen from the left in FIG. 21, FIG. 23 shows the pull rod according to FIG. 21 seen from below in FIG. 21, FIG. 24 shows the pull rod according to FIG. 21 seen from above in FIG. 21, FIG. 25 shows an outer sleeve and located therein an inner sleeve for said fifth embodiment, which sleeves are shown in axial section, FIG. 26 shows the arrangement according to FIG. 25 seen from above in FIG. 25, FIG. 27 shows a further embodiment of an outer sleeve seen as in FIG. 25 and intended for said fifth embodiment, FIG. 28 shows the sleeve according to FIG. 27 seen from below in FIG. 27, FIG. 29 shows the inner sleeve according to FIG. 25 seen as a section according to FIG. 33, FIG. 30 shows the inner sleeve according to FIG. 25 seen in a section G-G according to FIG. 33, FIG. 31 shows the inner sleeve according to FIG. 25 seen in a section H—H according to FIG. 33, FIG. 32 is a perspective view of an inner sleeve according to FIG. 25, FIG. 33 shows an inner sleeve according to FIG. 32 seen from the left in FIG. 32, FIG. 34 shows an outer sleeve with mounted inner sleeve for a sixth embodiment of a jointing device according to the invention, where the sleeves are shown in axial section, FIG. 35 shows schematically a pull rod intended for said sixth embodiment, where the pull rod is shown as the pull rod according to FIG. 14, FIG. 36 shows the pull rod according to FIG. 35 seen from the right in FIG. 35, FIG. 37 shows the pull rod according to FIG. 35 seen from below in FIG. 35, FIG. 38 shows the pull rod according to FIG. 35 seen from above in FIG. 35.

GENERAL DESCRIPTION OF THE VARIOUS EMBODIMENTS

Figure 39:
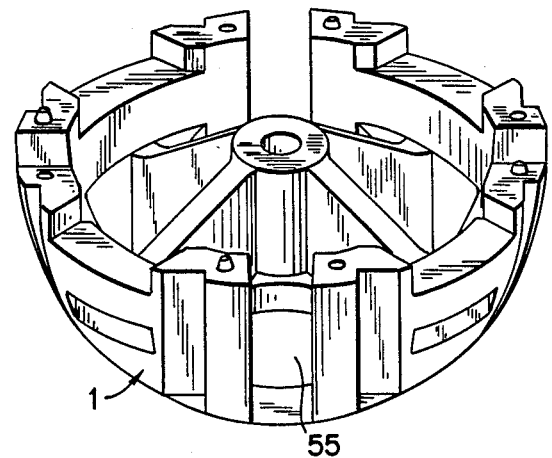
FIG. 39 is a perspective view of half a junction member seen toward the dividing plane and intended together with a corresponding half to form a spherical junction member.

In FIG. 1 the numeral 1 designates a junction member according to the invention where the only partially shown junction member is substantially spherical and provided with an inner cavity. The junction member comprises at least one slit-shaped lead-in 2 extending along a great circle. At the preferred embodiment of the junction member 1 shown in FIG. 2 three pairs of opposed slit-shaped lead-ins 2 are provided, of which each pair are located in a separate plane and the pairs are located in three planes perpendicular to each other. In some of the FIGS. only some lead-ins are shown, for the sake of clearness.

The junction member 1, thus, is intended to be a junction, at which one or several tubes 3 are intended to be attached, and each tube 3 is intended with one end 4 to co-operate with the jointing device, and where means to be described in greater detail later on are provided inserted into a tube 3 at one end 4 thereof and to be attached in the tube, in such a manner, that a pull rod or the like, which will be dealt with later on, is intended to co-operate with the junction member 1, which is intended to be a holder for the pull rod and a device whereby the junction member 1 is on the tube.

The embodiments shown of the jointing device according to the invention have in common, that the end 6 of the pull rod 5 which is intended to co-operate with the junction member 1 comprises an axially extending portion 7 and an outer transversal portion 8, thereby forming substantially a T-shape, where the end 6, i.e. the T-shaped portion 6, is substantially thinner in the direction of thickness perpendicularly to the plane, in which the T-shape is located, than the extension of the transverse portion 8 in said plane. The T-shaped portion 6 is intended to be inserted in and to co-operate with a lead-in 2. The length of the lead-in exceeds the extension of the traverse portion 8, and the width of the lead-in slightly exceeds the extension of the T-shaped portion in said thickness direction.

According to one embodiment of the pull rod, FIG. 3, the T-shaped portion is comprised in a separate outer pull rod portion 9, which by means of a threaded inner portion 10 is fastened in an additional, inner, portion 11 of the pull rod 5, in such a manner, that the outer pull rod portion 9 can be moved to and from said additional portion 11.

Preferably at least a portion of the axially extending portion 7 at the end 6 of the pull rod has such cross-section, that the T-shaped portion after having been inserted through a lead-in 2 for co-operation with the junction member can be rotated, from the position occupied at the insertion, about its axial direction through a predetermined largest angle, preferably about 90°, in a predetermined direction, and substantially cannot be rotated in the opposite direction. The said portion of the axially extending portion, thus, see FIG. 4, has, for example, substantially rhombic or spool-shaped cross-section where the greatest diagonal 12 or corresponding direction of extension is considerably greater than the width of said lead-in, and where the diagonal or corresponding direction forms an angle substantially smaller than 90°, e.g. about 45°, with the thickness direction of the T-shaped portion 6, which thickness direction is substantially perpendicular to the plane, in which the T-shape is formed.

At the embodiments according to FIGS. 1, 6 and 7 the said additional portion 11 of the pull rod is rotatable and capable to co-operate with parts of means inserted into a tube 3 at the end thereof, which means at the embodiments according to FIGS. 1, 6 and 7 are expandable means to be described later on. The rotation of said additional portion into a predetermined direction is intended to have the effect, that the separate outer pull rod portion 9 in co-operation with the junction member is threaded into the additional portion, whereby the pull rod is shortened and the expandable means are intended to be expanded in radial direction, preferably by keying action between portions of the expandable means.

According to preferred embodiments, FIGS. 1, 6 and 7, an axial sleeve 13 or the like is located between the tube 3 and junction member 1, into which sleeve a portion 14 of said additional pull rod portion 11 is intended to be inserted and substantially non-rotary to co-operate, in such a manner, that upon rotation of the sleeve 13 the said additional portion 11 is caused to rotate correspondingly.

At the embodiments according to FIGS. 1, 6 and 7, thus, expandable means are provided for co-operation with a tube. At the embodiment according to FIG. 1 the expandable means comprise a sleeve 15 or the like consisting of one or several, in FIG. 1 two, separate portions 14, which sleeve is intended to co-operate with the inner wall 3' of a tube and comprises a central cavity 16 tapering toward the junction member, for example a substantially cone-shaped cavity 16, and a key member 17, co-operating with the pull rod and axially movable as well as axially tapering toward the junction member, which key member is intended to co-operate with the sleeve 15 for expanding the same. At the embodiment shown the key member 17 is substantially cone-shaped and comprises an axial cavity, in which the pull rod is intended to run. Said pull rod has at its inner end an end stop 18 for co-operation with the key member 17.

At the embodiments according to FIGS. 6–8 the expandable means comprise a preferably thin-walled sleeve 19 intended to co-operate with the inner wall 3' of a tube 3 and comprising in its wall 20 a slit 21 tapering axially toward the junction member and a key member 22, which is connected with the pull rod, axially movable and tapering axially toward the junction member, which key member 22 is intended to co-operate with the slit 21 of the sleeve 19 for expanding the sleeve. At the embodiment shown, the sleeve 13 comprises at its portion remote from the junction member a flange 23 projection in circumferential direction, which is intended to co-operate with one or several of step portions 24 comprised in the sleeve 19, whereby the sleeve 19 is rotatably connected to the sleeve 13. The pull rod comprises at its portion remote from the junction member an end stop 25 intended to co-operate with step portions 26 of the portion of the key member 22 which faces toward the junction member. The key member 22 preferably is formed so as together with the sleeve 19, FIG. 8, to form a substantially cylindric sleeve.

At the embodiments according to FIGS. 9–12 a sleeve 27 or the like is provided to preferably partially be inserted and attached in a tube 3 and with an outer portion 28 preferably directly to rest against the junction member. The sleeve 27 comprises internal stop members extending axially or partially axially, such as bars 29 or grooves. For the sake of clearness only one axial bar 29 is shown in FIG. 9. The pull rod comprises at least one substantially radially projecting stop member 30, such as a stop wing 30 or the like, intended with its outer portion 31 to co-operate with said stop member 29 in such a manner, that the pull rod is rotatable about the axial direction relative to the sleeve 27 in a predetermined direction, but substantially not in the opposite direction. Each stop wing 30, FIG. 12, preferably is slightly resilient and at its outer portion slightly deflecting in circumferential direction, whereby the stop wing upon rotation in said predetermined direction snaps past said stop member and upon rotation in the opposite direction is caught against a stop member, and a very great force is required to cause the stop wing to pass the stop member. Also according to a preferred embodiment, the portions of said stop member intended to stoppingly co-operate with a stop wing run angularly relative to the axial direction, for example about 45° to the axial direction, and the outer portion of each stop wing preferably is adapted to the stop members thus angled. Hereby upon rotation in "stopping direction" axial movement between pull rod and sleeve can be achieved. In FIG. 9 stop members thus angled are shown schematically, of which for the sake of clearness only one stop member is shown, which members are located in the half of the sleeve 27 remote from the observer and, thus, behind the bolt 5. At the present embodiment the said stop member 29, thus, can be said to be "left-hand threaded" in the sleeve 27.

At the embodiment according to FIGS. 9–12 it also is preferred that the pull rod in connection to the outer transverse portion 8 comprises at least one projecting locking portion 32, where each locking portion projects in a radial and also axial plane offset about 90° relative to the plane, in which said T-shape is located, and each locking portion is arranged to insert slightly into a lead-in of the junction member after insertion of the T-shaped portion through the lead-in and rotation of the T-shaped portion to a position transverse to the plane of the lead-in, in which position the T-shaped portion cannot be moved out through the lead-in.

It also is preferred that the transverse portion of the T-shaped portion and, where applicable, locking portion(s) joining the T-shaped portion are bevelled in a suitable way by bevels 8', 32', so that initial rotation in a predetermined direction with said portions in co-operation with a lead-in is facilitated, FIGS. 9 and 11. The bevelling of the portion 8 facilitates initial rotation to a position transverse to the plane of the lead-in, and the bevelling of the portions 32 facilitates initial rotation out of engagement with the lead-in.

It is, of course, possible to imagine more arrangements for attaching a tube to a device according to the invention than they were dealt with above. At the device shown schematically in FIG. 13 a locking means 33 of substantially coil spring configuration is intended to be inserted, preferably by being rotated, into a tube and fastened therein in axial direction. The function of stop means and stop members is here corresponded by friction and spring force.

At the embodiment according to FIGS. 14–20, which substantially is of the same kind as the embodiment according to FIGS. 9 - 12, a different arrangement of pull rod 5 and sleeves is used. A sleeve 34 is intended to be inserted into a tube 3 and be fastened therein. The sleeve 34 comprises at least at its portion 34' remote from the junction member internal stop members 35 in the form of grooves 35, which extend angled relative to the axial direction substantially as the angularly extending stop members 29 in FIG. 9. The numeral 36 designates two stop members arranged at the pull rod one on each side of the central axis of the sleeve 34, which stop members are intended to co-operate with said stop members 35 so that the pull rod without axial displacement is rotatable about the axial direction relative to the sleeve 34 in a predetermined direction, but substantially not in the opposite direction.

The stop members 36 are located each on a lug-shaped supporting arm portion 38, which portions project from the inner disc-shaped end flange 39 of the pull rod and extend axially and substantially in parallel with each other each on one side of the central axis of the sleeve.

Each stop member 36 has wing-like shape and, seen perpendicularly to the axial direction and in parallel with the main extension plane of the supporting arm portion, extends in the direction from the central line of the sleeve, forming an acute angle, e.g. 45°, with the central line, as shown in FIGS. 14 and 15. The stop members 36 project in the opposite direction, as appears from FIG. 5. The stop members 36 can be said to project substantially radially when they are directed substantially along a chord in the sleeve 34.

The numeral 40 designates an internal stop flange for the inner end 39 of the pull rod defining an outermost position for the pull rod.

The numeral 41 designates an inner sleeve intended to be located in the sleeve 34 in connection to the end 42 of the sleeve 34 facing toward the junction member 1. The sleeve 41 is axially rotatable in relation to the sleeve 34 and preferably fastened in the sleeve 34, for example by means of an edge 43 at the end of the sleeve 34 facing toward the junction member, past which edge 43 an externally projecting portion 44 of the outer end 45 of the sleeve 41 can be spanned. The sleeve 41 comprises axially extending internal guide members 46, FIGS. 17 and 19, such as bars, intended to co-operate with the pull rod to render possible axial movement of the pull rod without simultaneously rotating the same in a predetermined direction. Along the circumference of the sleeve 41, for example, four equally spaced bars 46 are located. A cross-section, FIG. 16, of the pull rod, preferably a central axial portion 47 thereof, comprises corner portions 48 capable to be guided to the bars 46 and preventing rotation in a certain direction, counter-clockwise in FIG. 19. Corner portions 48' also are provided to be guided to bars 46 where the corner portions 48' and bars 46 are arranged so that rotation in one direction, clockwise in FIG. 19, is possible.

The end portion 45 of the inner sleeve 41 facing toward the junction member comprises fixing flanges 49 intended to co-operate with corresponding members 50 at the junction member 1, which members 50 at the lead-ins of the junction member extend in parallel with and each on one side of the respective lead-in in the main extension direction thereof, as shown in FIG. 14, whereby a distinct mutual position between the inner sleeve 41 and lead-in is intended to be achieved.

In FIGS. 21–38 two further embodiments of the jointing device according to the invention are shown, which are substantially of the same kind as the embodiment shown in FIGS. 14–20 and comprises a sleeve 34, outer sleeve 34 and an inner sleeve 41, which sleeves have substantially the same function and configuration as the sleeves according to the embodiment shown in FIGS. 14–20. By way of example, the sleeve 34, FIGS. 25 and 34, is provided with marked external threads 51 and intended to be treaded into a tube, and at its outer end 42 is provided with a key handle 42' or corresponding means, FIG. 26.

At the embodiment shown in FIGS. 25–33 with a pull rod substantially according to FIGS. 21–24, at least with respect to stop members 36, internal stop members 35 are provided which have the form of axially extending ridges arranged for co-operating with shoulder-shaped preferably axially extending stop members 36. At the variant shown in FIGS. 27 and 28 the inner shell surface of the sleeve 34 is filled with adjoining equally spaced ridges, where for minimizing the inclination of the members 36 relative to a diametrical direction the ridges are odd-numbered. The ridges are shaped so as to be able to be passed by the members 36 at relative rotation between the pull rod 5 and sleeve 34 in one direction and to lockingly co-operate with members 36 at relative rotation in the opposite direction, as appears from FIGS. 23 and 28, where the members 36, FIG. 23, by bevelling have been adapted to the function thus desired.

At the embodiment shown in FIGS. 34–38 stop members 35 extend in the form of bars, which between themselves form grooves angled relative to the axial direction in substantially the same way as at the embodiments according to FIGS. 9–12 and, respectively, FIGS. 14–20. The stop members 36, FIGS. 35–38, consist of shoulders extending angularly in a corresponding way, each shoulder preferably located on a supporting portion 38 in the form of a disc-shaped portion running in a helix, which portion extends substantially perpendicularly to the stop members 36 running in a helix.

The pull rods 5 according to FIGS. 21–24 and, respectively, FIGS. 35–38 are provided with stop shoulders 53 or the like supported by substantially axially extending supporting arms 52, for co-operating with internal guide members 46 at the inner sleeve 41, which guide members here consist of axially extending grooves 46. Each stop shoulder 53 faces outward, i.e. toward the inner wall of the sleeve 41. At the embodiments shown, two supporting arms 52 are located diametrically along a diameter in parallel with the outer transvese portion 8 of the pull rod 5, as shown in FIG. 21.

The supporting arms 52 and stop shoulders 53 are arranged, for example in such a way according to the Figures, that the arm 52 is relatively rigid at the movement of the stop shoulder and, in this case, the free end 52' of the arm about the axial direction of the pull rod, i.e. in tangential direction at the sleeve 41. Such movement is effected by relative rotation between the pull rod 5 and sleeve 41. The arm, furthermore, is relatively softer at movement of the stop shoulder and, in this case, free end of the arm perpendicularly to the axial direction of the pull rod, i.e. in radial direction at the sleeve 41 and, normally, inward to the central axis of the sleeve.

This function of the supporting arm is brought about, for example, in the way shown in the Figures, i.e. in that the arm 52, which extends from an attachment 52", is thin in radial direction and easy to bend in radial direction, and thicker substantially in tangential direction. At a preferred configuration each arm 52 is substantially bar-shaped, where the main extension direction of the cross-section of the bar in a plane perpendicular to the axial direction of intended to extend in the sleeve 41 substantially as a portion of a chord extending spaced from the centre.

The stop shoulders 53 according to one embodiment are by bevelling 53' on one side arranged to facilitate the passage of a guide member 46 upon rotation in a certain direction.

The numeral 54, for example in FIGS. 21-24, designates radially projecting stop shoulders located in connection to the T-shaped portion and arranged to cooperate with a step-shaped widening (not shown) of the inner sleeve at the outer end thereof, which stop shoulders are intended to prevent the pull rod from being re-inserted into the sleever 41, at least under certain conditions.

Figure 40:
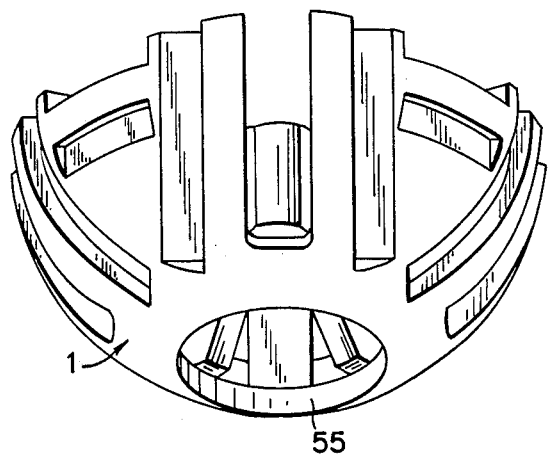
FIG. 40 shows the half according to FIG. 39 seen from the opposite direction.

At the embodiment shown in FIGS. 39 and 40 of the junction member, two opposed apertures 55 are provided, via which the halves can be joined together by a bolt or the like. Four symmetrically located lead-ins 2 extend substantially between the apertures 55. Furthermore, four symmetrically located lead-ins are provided in the division plane and extend substantially between the aforementioned lead-ins.

The function of the device according to the invention substantially should have become apparent from the aforesaid.

At the embodiments according to FIGS. 1, 6 and 7, thus, the T-shaped portion is inserted into a lead-in, and the entire device with the expandable means mounted in a tube is rotated in a predetermined direction. Due to the configuration of the cross-section of a suitable portion of the axial portion of the T-shaped portion, this T-shaped portion can be rotated only to a position where the transverse portion is located transversely to the plane of the lead-in, for example according to FIG. 7. Upon continued rotation the outer pull rod portion is threaded into the additional, inner, portion 11, whereby the sleeve is caused to abut the junction member. By rotating the sleeve the thread-in then can be continued by rotating the additional portion, whereby the additional pull rod portion, and thereby respective key members, are drawn in the direction to the junction member. Hereby expansion in radial direction is obtained, and the junction member is connected to the tube. The connection is disengaged in an obvious manner.

At the embodiment according to FIGS. 9-12, the sleeve 27 with mounted pull rod is fastened in a tube. The T-shaped portion in inserted into a lead-in, whereafter rotation in a predetermined direction takes place to a position where the transverse portion of the T-shaped portion is located transversely to the plane of the lead-in, and where, when appropriate, one or more locking portions 32 are snapped into the lead-in. The stop members and stop wings here are so arranged that upon rotation in said predetermined direction relative rotation between the pull rod and sleeve is prevented, whereby the T-shaped portion can be positioned transversely relative to the lead-in even when the necessary rotation takes place against a certain resistance. At disengaging the connection continued rotation takes place in said predetermined direction. By means of bevellings at the transverse portion and locking members initial rotation relative to the lead-in is facilitated. As previously, relative rotation between the sleeve and pull rod is prevented by means of stop members and stop wings. Upon rotation in the opposite direction, which is required when the other end of the tube is to be fastened in a corresponding manner, the rotation can take place without disengaging the connection, because the stop wings, primarily due to their configuration, can pass the stop members at rotation in this direction. The pull rod 5 preferably is intended to be retained in the sleeve 27 by means of an end stop 5' and by locking members 32, which are intended to radially project past the inner wall of the sleeve portion 28 at the end of the sleeve portion 28 facing to the junction member.

At the embodiment according to FIGS. 14-20 the sleeve 34 with mounted pull rod and preferably also sleeve 41 is fastened in a tube 3. The T-shaped portion of the pull rod is inserted into a lead-in a.o. by rotating the tube 3 and therewith the sleeve 34, whereby stop members 36 of the pull rod co-operate with stop members 36 in such a manner, that because the stop members 36 upon rotation of the tube cannot pass the stop members 35, the pull rod is moved axially in the direction to the junction member. Hereby the pull rod is guided in the sleeve 41 via the bars 46 or corresponding means. The pull rod is axially movable to a limited extent, for example by means of the inner end 39, as shown in FIG. 14, and so adapted that, when as shown in FIG. 14 the end position has been reached, instead of axial movement a rotation of the pull rod takes place, so that the T-shaped portion is positioned transversely relative to the lead-in at the junction member and can be caused to assume the position shown in FIG. 14. By co-action between the fixing flanges 49 of the sleeve 41 and the corresponding means 50 at the junction member, a distinct mutual position between the inner sleeve 41 and lead-in can be achieved. By further rotation through 90° in the same direction, the T-shaped portion can be given a position so that it can be moved out through the lead-in. Upon rotation of the tube 3 and sleeve 34 so that axial movement or rotation in the way indicated takes place, at the other end of the tube, where appropriate, a relative rotation between the sleeve 34 and pull rod takes place in such a way, that the stop members 36 are caused to pass the stop members 35. Relative rotation between the pull rod and sleeve 41, at the embodiment according to FIG. 19, can take place in one direction.

The function of the two embodiments shown in FIGS. 21-38 is substantially the same as at the embodiments according to FIGS. 14-20. At the jointing operation, thus, the outer sleeve 34 with mounted inner sleeve 41 and pull rod 5 is fastened in a tube. The outer portion 8 of the pull rod is inserted into a lead-in of a junction member. Upon rotation of the tube and therewith the outer sleeve 34 in a certain direction, the stop members 35 co-operate with the stop members 3 in a stopping manner so that the pull rod is rotated with the outer sleeve. After rotation through 90° a locking position between lead-in and the portion 8 has been assumed. After continued rotation through 90° at continued tension the pull rod can be removed out of the lead-in. At rotation in this direction the stop shoulders pass the guide means 46. The inner sleeve 41 is rigidly positioned relative to the junction member.

Upon rotating the tube and therewith the outer sleeve in the opposite direction, the pull rod 5 is held rigidly positioned relative to the junction member by means of the stop shoulders 53, which stoppingly co-operate with the guide members 46 and inner sleeve. The stop members 36 hereby can pass the stop members 35. Rotation in this direction corresponds at the other end of the tube to a rotation, at which jointing or loosening of the joint takes place, i.e. a rotation, at which the stop members 36 stoppingly co-operate with the stop members 35.

The arrangement with stop arms 52 and stop shoulders 53 is especially adapted for reducing wear between the stop shoulders or corresponding means and the guide members 46, and to provide distinctivity to "locked" and "unlocked" position of the portion 8 and a lead-in. Due to the design described with, in respect of bending, relatively high rigidity at the movement of the free end of the arm in tangential direction relative to the place of attachment of the arm and relatively considerably lower rigidity as regards radial movement of the end relative to the place of attachment, at rotation between the pull rod 5 and sleeve 41 a change in the normal force direction in the contact stop shoulders 53/guide members 46 takes place, as the direction of the normal force depends on the tangent direction at the attachment of the arm in the pull rod. At sufficiently great change the shoulders 53 slide off the guide members 46. The direction of the force depends on how much the pull rod 5 and therewith the rigid link at fastening has been rotated relative to the contact place stop shoulder/guide member, compared with the neutral position, in which the arm is not loaded.

As should have become apparent from the above description, the invention provides a simple and expedient device for the object here concerned. Owing to the preferred embodiment of junction members, a great number of different tube configurations can be effected.

The invention has been described above with reference to some embodiments. It is, of course, possible to imagine more embodiments and minor alterations without thereby abandoning the invention idea.

The expandable means, for example, can be designed in a different way. At the embodiment according to FIG. 1, the outer sleeve can be imagined to co-operate with the pull rod, in which case the outer sleeve widens in the direction to the junction member in order to co-operate with a key member, which tapers in the direction away from the junction member.

According to one embodiment, FIG. 5, the end 6 closest to the transverse portion 8 has a cross-section comprising two parallel sides 6' extending in the thickness direction of the end 6 and forming between themselves a portion slightly narrower than the width of the lead-in 2, whereby the end is locked against rotation when the portion 8 assumes a position transversely to the plane of the lead-in and is drawn to abut the inner wall of the junction member.

The jointing device according to the invention can be manufactured both of metallic material and, for example, of plastic material. Also combinations of plastic parts and metallic parts are possible.

The embodiments shown are arranged to comprise means, by which the device is fastened in a tube. The tube can in every individual case be adapted to the design in question by only cutting to desired length. More expensive prefabrication of tubes is avoided. A jointing device according to the invention, however, can be used also at prefabricated tubes. The devices intended to be inserted into a tube 3 at one end 4 thereof can be imagined to consist of an end wall piece attached to the tube, through which piece a pull rod provided with a head or the like projects, the piece constituting a holder-on for the pull rod.

The invention, thus, must not be regarded restricted to the embodiments described above, but can be varied within the scope of the attached claims.

I claim:

1. A jointing device for scaffolding or stand systems, for example in exhibition show cases the the like, which system is assembled of tubes, each tube having essentially equal inner and outer diameters relative to the other tubes, where the jointing device is a junction, to which at least one tube is adapted to be attached, and any said tube is intended with one end to co-operate with the jointing device; said jointing device includes a substantially spherical junction member and connecting means adapted to be inserted in a tube at one of its ends and to be fastened in the tube, and including a pull rod provided to co-operate with said substantially spherical junction member, which junction member is thereby fixed on the tube and arranged for co-operation with more than one pull rod and its associated connecting means and its associated tube; and end of the pull rod which will co-operate with said substantially spherical junction member comprising: an axially extending portion and an outer transverse portion, thereby forming a substantially T-shaped portion, where the T-shaped portion is considerably thinner in the cross-section dimension in a direction perpendicular to the planar T-shape, than is the dimension of the transverse part of the planar T-shape, and that the junction member is provided with an inner cavity and comprises at least one longitudinal slit-shaped lead-in passage for the T-shaped end portion of a pull rod, so constructed that the elongate dimension of the lead-in passage exceeds the transverse part of the T-shaped portion and the width of the lead-in passage slightly exceeds the extension of the T-shaped portion in its said cross-section thickness direction; said jointing device also including a substantially sleeve-shaped attachment member, being provided on said pull rod end, to be inserted and fastened in said tube at the end thereof and to co-operate with the junction member, said attachment member comprising internal, circumferentially spaced and at least partially axially extending stop means, and said pull rod (5) comprising at least one stop member (30, 36) arranged to co-operate with said stop means so that the pull rod is maintained in fixed axial position relative to said sleeve-like attachment member, and can be rotated about the axis of and relative to the sleeve-like attachment member in one predetermined rotational direction, but substantially prevented from rotation in the opposite rotational direction; said portions of said stop means (29, 35) intended to co-operate with a stop member are extended at least partially axially and said stop member is arranged in the same at least partially axially disposition relative to the stop means; and wherein, in connection to the end (42) of the sleeve-shaped attachment member (34) facing the junction member, an inner sleeve (41) is located in the sleeve-shaped attachment member, which inner sleeve comprises axially extending inner guide members (46), which are alternating bars and grooves, for cooperation with the pull rod (5) to render possible, axial movement of the pull rod without simultaneously rotating the same in a predetermined direction; and said pull rod (5) which cooperates with said guide members (46) of the inner sleeve (41) is provided with at least two substantially axially extending, supporting arms (52) including stop shoulders (53).

2. A device as defined in claim 1, characterized in that the junction member (1) is substantially spherical with an inner cavity and consists of two equal and identical halves, providing a division plane between said halves; which junction member (1) comprises two opposed apertures (55), one in each half, via which the halves can be joined together with a bolt, and four symmetrically located lead-in passages (2) extend substantially between the apertures (55), and said four lead-in passages extend symmetrically and substantially through the division plane of the junction member.

3. A device as claimed in claim 1, wherein said stop means comprises alternating bars and grooves extending axially on the interior of said sleeve-shaped attachment member.

4. A jointing device for scaffold or stand systems, for example in exhibition show cases and the like, which system is assembled of tubes, each tube having essentially equal inner and outer diameters relative to the other tubes, where the jointing device is a junction, to which at least one tube is adapted to be attached, and any said tube is intended with one end to co-operate with the jointing device; said jointing device includes a substantially spherical junction member and connecting means adapted to be inserted in a tube at one of its ends and to be fastened in the tube, and including a pull rod provided to co-operate with said substantially spherical junction member, which junction member is thereby fixed on the tube and arranged for co-operation with more than one pull rod and its associated connecting means and its associated tube; and end of the pull rod which will co-operate with said substantially spherical junction member comprising: an axially extending portion and an outer transverse portion, thereby forming a substantially T-shaped portion, where the T-shaped portion is considerably thinner in the cross-section dimension in a direction perpendicular to the planar T-shape, than is the dimension of the transverse part of the planar T-shape, and that the junction member is provided with an inner cavity and comprises at least one longitudinal slit-shaped lead-in passage for the T-shaped end portion of a pull rod, so constructed that the elongate dimension of the lead-in passage exceeds the transverse part of the T-shaped portion and the width of the lead-in passage slightly exceeds the extension of the T-shaped portion in its said cross-section thickness direction; said jointing device also including a substantially sleeve-shaped attachment member, being provided on said pull rod end, to be inserted and fastened in said tube at the end thereof and to co-operate with the junction member, said attachment member comprising internal, circumferentially spaced and at least partially axially extending stop means, and said pull rod (5) comprising at least one stop member (30, 36) arranged to co-operate with said stop means so that the pull rod is maintained in fixed axial position relative to said sleeve-like attachment member, and can be rotated about the axis of and relative to the sleeve-like attachment member in one predetermined rotational direction, but substantially prevented from rotation in the opposite rotational direction; said portions of said stop means (29, 35) intended to co-operate with a stop member are extended at least partially axially and said stop member is arranged in the same at least partially axially disposition relative to the stop means; and wherein, in connection to the end (42) of the sleeve-shaped attachment member (34) facing the junction member, an inner sleeve (41) is located in the sleeve-shaped attachment member, which inner sleeve comprises axially extending inner guide members (46), which are alternating bars and grooves, for cooperation with the pull rod (5) to render possible, axial movement of the pull rod without simultaneously rotating the same in a predetermined direction; and said guide members of said inner sleeve (41) are arranged to co-operate with elongate portions of the pull rod (5); said pull rod being provided with at least two substantially axially extending, supporting arms (52) including stop shoulders (53) and wherein each supporting arm (52) with stop shoulder (53) is arranged so that the arm (52) is relatively rigid in movement of the stop shoulder (53), and therewith of the end of the arm (52), annularly relative to the elongate disposition of the pull rod (5), corresponding tangentially to the inner sleeve (41), and so that the arm (52) can flex due to movement of the stop shoulder (53), and therewith of the free end (52') of the arm (53), radially transverse to the elongate disposition of the pull rod (5).

5. A device as claimed in claim 4, wherein said stop means comprise alternating bar and grooves extending axially on the interior of said sleeve-shaped attachment member.

6. A device as defined in claim 4, characterized in that each supporting arm (52) extending from an attachment (52") to the pull rod is thin in a direction radial of the pull rod and inner sleeve (41) and easy to flex in the radial direction, and the arm (52) preferably is substantially bar-shaped, in such a manner, that the transverse cross-section of said bar is intended to extend within the inner sleeve (41), effectively as a portion of a chord-line spaced from the centre of the sleeve.

7. A device as claimed in claim 6, wherein said stop means comprises alternating bars and grooves extending axially on the interior of said sleeve-shaped attachment member.

* * * * *

UNITED STATES PATENT AND TRADEMARK OFFICE
CERTIFICATE OF CORRECTION

PATENT NO. : 4,884,915　　　　　　　　　　　　　　　　Page 1 of 2

DATED : December 5, 1989

INVENTOR(S) : PETER CAMITZ

It is certified that error appears in the above-identified patent and that said Letters Patent is hereby corrected as shown below:

ON THE COVER PAGE:

Item [22] should read

[22] PCT Filed: May 23, 1986

Between items [22] and [30] please insert

[86] PCT No.: PCT/SE86/00241
　　　　　§ 371 Date: Jan. 23, 1987
　　　　　§ 102(e) Date: Jan. 23, 1987

[87] PCT Pub. No.: WO 86/07119
　　　　　PCT Pub. Date: Dec. 4, 1986

IN THE SPECIFICATION:

Column 2, line 25, "100" should read --11--.

Column 7, line 31, "treaded" should read --threaded--.

UNITED STATES PATENT AND TRADEMARK OFFICE
CERTIFICATE OF CORRECTION

PATENT NO. : 4,884,915

DATED : December 5, 1989

INVENTOR(S) : PETER CAMITZ

It is certified that error appears in the above-identified patent and that said Letters Patent is hereby corrected as shown below:

IN THE CLAIMS:

Column 11, line 30, change "scaffolding" to --scaffold--.

, line 31, change "the the" to --and the--.

, line 45, change "and" (second occurrence) to --an--.

Column 12, line 54, change "and" (second occurrence) to --an--.

Signed and Sealed this

Eighteenth Day of December, 1990

Attest:

HARRY F. MANBECK, JR.

*Attesting Officer*     *Commissioner of Patents and Trademarks*